Figure 1:
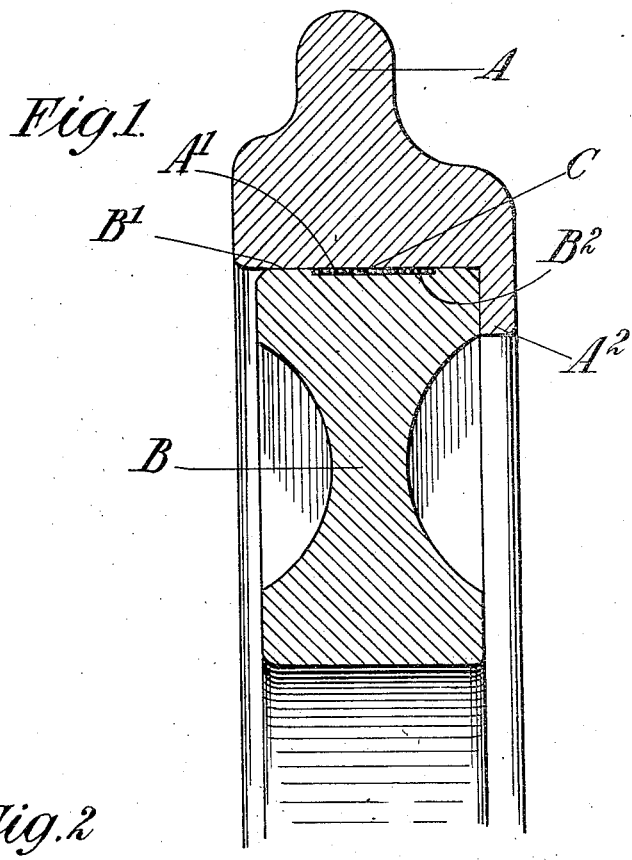

T. SLOPER.
MOLD.
APPLICATION FILED NOV. 18, 1915.

1,198,875.

Patented Sept. 19, 1916.

Witnesses

Inventor
Thomas Sloper

UNITED STATES PATENT OFFICE.

THOMAS SLOPER, OF DEVIZES, ENGLAND.

MOLD.

1,198,875.  Specification of Letters Patent.  Patented Sept. 19, 1916.

Application filed November 18, 1915. Serial No. 62,197.

*To all whom it may concern:*

Be it known that I, THOMAS SLOPER, a subject of the King of England, residing at Devizes, in Wiltshire, England, have invented certain new and useful Improvements in Molds, of which the following is a specification.

This invention is for improvements in or relating to molds and articles manufactured thereby, and has reference to the type of mold wherein one part is desired to effect a pressing or sealing movement toward another after all the parts, as well as the material to be treated or formed into an article, are in place.

The invention is particularly applicable to molds for vulcanizing rubber goods. It is well-known that the material to be vulcanized to form the article, say, a thin band or lining for a pneumatic tire, is commonly built up on a circular "former" and to vulcanize the band, the "former" is placed inside a surrounding mold-element wherewith it coöperates to constitute a mold. This surrounding mold portion is made in two or more sections, and means are provided for advancing these sections forcibly toward the "former" so that the band is pressed between them and the cavity in which it lies is sealed by the close contact of the various parts of the mold with each other. This form of mold, however, has the disadvantage that the pressure is not uniformly distributed and a mark is produced on the outside of the molded article at the point where any two sections of the mold join, so that it would be of considerable advantage if the interior "former" and the surrounding mold-element could each be made in a single piece. This, however, has not up to the present been done as the article to be vulcanized on the "former" must pass with the "former" easily into the surrounding mold-element, and pressure must be applied during vulcanization.

Another method of vulcanizing articles on a "former" is to wrap the article and the "former" around with canvas to put the necessary pressure on the article to be vulcanized. This method has the disadvantage that for producing cheap articles, the cost of the canvas, which can only be used a few times, adds to the cost of production, and further, a thin article is liable to be distorted in the process of wrapping.

This invention consists broadly in a mold wherein the parts (or the supports of such parts) between which the material to be treated is to be subjected to heat under pressure as in the process of vulcanization, are composed of materials having considerably different coefficients of expansion and are so arranged that as the mold is heated the greater expansion of one part relatively to the other exerts the requisite pressure upon the material to be treated, with or without the arrangement being such that the expanding movement seals the material in the mold.

Preferably the expansible member of the mold, *i. e.* that part having the greater coefficient of expansion, is entirely surrounded by the other part or member, and one of these members may be recessed so that the two parts of the mold may entirely close and seal the material to be treated, between them, when the mold is heated sufficiently for the required expansion to take place.

The expansible member need not be solid, *i. e.* all composed of one material. It may be a composite member comprising for example a ring of material having a high coefficient of expansion, say, zinc, carried by a support made of a less expensive material, say, iron, whose coefficient of expansion may be less than that of the part it supports.

Figure 2:
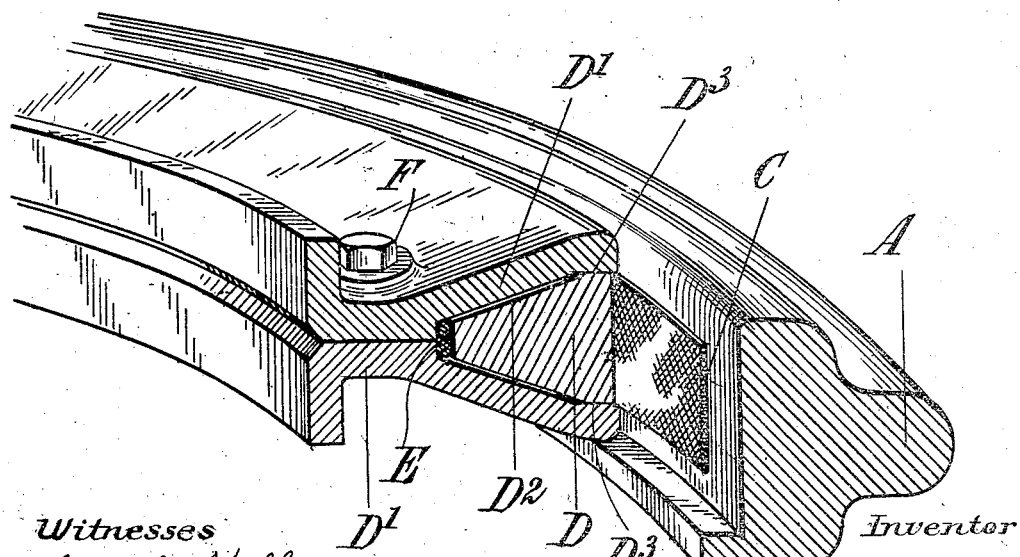

In the accompanying drawings which illustrate two methods of carrying out this invention:—Figure 1 is a transverse section of one form of mold, and Fig. 2 is a perspective view of another form of mold, part being broken away to show the cross-sectional form.

The outer member A of the mold may be of cast iron and is in the form of a ring having a smooth inner molding face $A^1$ and an inwardly-directed side flange $A^2$. The inner or expansible member B is of zinc or other material, or mixture of materials, which has a high coefficient of expansion relatively to the material of the outer member. This expansible member is also in the form of a ring and its peripheral face $B^1$ is channeled or grooved at $B^2$ to receive a band C (hereinafter more fully described) which is to be vulcanized.

It is found that if, with the parts A and B made in the form and the proportions shown, the circumference of the ring B being about 6 feet and a clearance between the opposing faces $A^1$, $B^1$ of twenty-five thousandths of an inch is allowed all around, this clearance allows the expansible member and the article, to be inserted easily in the mold, but will be filled up by the expansion of the member B when the mold is heated for vulcanizing and thus the requisite pressure is applied to the band C and the channel in which the band lies is effectually sealed by the face $B^1$ being forced against the face $A^1$. When treating a thin band, such as C, (and the process is not suitable for thick articles) this sealing is not essential, so that the faces $B^1$, $A^1$ need not be made to come into close contact, and in fact the channel $B^2$ may be dispensed with, the size of the ring B being made such that it can, with the band on its periphery, be easily dropped into place, and then when it expands will exert the requisite pressure on the band. The flange $A^2$ constitutes a convenient shoulder against which the member B rests when dropped into place and enables the two parts to be readily handled by grasping the outer part A only, and thus no fastenings are required between these two parts. As a zinc ring is liable to get damaged in use the said expansible member instead of being solid as shown in Fig. 1, may be a composite member as shown in Fig. 2. In this figure, the outer member A is the same as in Fig. 1, but the zinc or other expansible body is in the form of a ring D of approximately V-shaped cross-section and is carried in an approximately V-shaped trough $D^2$ provided in a ring $D^1$. The inner faces of the trough $D^2$ at the outer edges $D^3$ are parallel and the corresponding portions of the zinc ring D are parallel. The ring D is made to a loose fit in the trough and is centered radially therein by compressible packing composed for example of one or more cords of asbestos E, placed at the bottom of the trough.

It is found that if a ring such as D be mounted in an iron channeled member and be made a tight fit therein, it is liable to fracture in cooling, because it cools more quickly than the iron support whereas if the ring D be so mounted as to have a measure of free play in the trough $D^2$ of the ring $D^1$ as described, it exerts all the necessary pressure on the band C, and as it can expand and contract freely in all directions it does not break. The packing E although centering the ring yields to pressure and therefore does not break it and the sides of the ring and trough are made a sufficiently close fit, especially at $D^3$, to keep the ring from buckling laterally without being so tight as to cause it to jam when heated.

It will be seen that with this form of expansible member, the groove or channel for the band C is provided by making the part D smaller in diameter than the part $D^1$, and this latter need only be made a sliding fit in the member A as both A and $D^1$ may be of the same material, say, cast iron.

The ring $D^1$ is made of two parts secured together by bolts and nuts F, whereof only one of the bolts is shown. Obviously the ring A and even the rings B and D may be built up of more than one part if desired, provided no parts in any one element in contact with the material are movable relatively to one another to bring pressure to bear on the material to be molded. It will be appreciated that mold members made up of several parts can be accurately joined even at the molding faces, so that no projection or roughness will appear on the molded goods, but this is not the case when the separate movement of such mold parts is depended upon to exert the requisite pressure. This invention, therefore, includes mold members built up of several parts, but does not apply to those wherein a plurality of parts composing the molding faces are mechanically movable in or out to exert pressure on the material to be molded.

These molds are particularly suited for making endless tapes or bands, such as are employed in cigarette manufacturing machines. It is necessary that the exterior of these bands shall be quite free of any transverse projections or roughnesses as the bands are drawn through dies in the machines, and such projections tend to considerably decrease the life of the band, because the band would be subjected to greater wear at these parts, and also each projection causes increased tension on the band as the portion having the projection on it passes through a die and a certain amount of tugging results. The bands shown at C are for this purpose, and are built up of thin longitudinal cords placed side by side and covered with a wrapping of fine rubbered canvas. The composition of the bands constitutes no part of the present invention, which is only for the mold or any article vulcanized therein. The invention is, however, particularly suited to the molding of cigarette machine bands or tapes as it enables a band to be produced, having a perfectly smooth exterior which passes easily and with little friction through the dies of the cigarette machine.

It will be appreciated that the construction of the molds can be variously modified without departing from the spirit of this invention.

What I claim as my invention and desire to secure by Letters Patent is:—

1. For applying pressure to material while it is heated as in vulcanizing, a mold structure comprising parts composed of metals having different coefficients of expansion and having these parts arranged in such manner that as the mold is heated the surfaces between which the material is placed are forced together by the difference of expansion of the parts, substantially as set forth.

2. In a mold for applying pressure to material while it is heated as in vulcanizing, the combination of an inner part, and an outer part which entirely encircles the inner part but leaves a space between the two parts to receive the material to be treated, the said inner part being made of a metal having a considerably higher coefficient of expansion than the outer part, so that when the mold is heated the inner part expands and presses the material to be treated against the opposing face of the outer part, substantially as set forth.

3. In a mold for applying pressure to material while it is heated as in vulcanizing, the combination of an inner part, and an outer part which entirely encircles the inner part but leaves a space between the two parts to receive the material to be treated, one of the parts moreover being recessed to receive the material, and the said inner part being made of a metal having a considerably higher coefficient of expansion than the outer part so that when the mold is heated the inner part expands and the material to be treated is thus pressed into the recess and the recess is sealed by its edges being brought to bear against the non-recessed portion of that mold part opposed to it, substantially as set forth.

4. In a mold for applying pressure to material while it is heated as in vulcanizing, the combination of an outer annular member, and an inner circular member whose coefficient of expansion is considerably higher than that of the outer member, which inner member receives the material to be treated on its periphery and whose diameter is such that it can be placed easily within the outer member with the material on it, but is big enough so that when heated it will expand sufficiently to press the material firmly against the outer member, substantially as set forth.

5. In a mold for applying pressure to material while it is heated as in vulcanizing, the combination of an outer annular member, and an inner circular member whose coefficient of expansion is considerably higher than that of the outer member, which inner member has a peripheral channel to receive the material to be treated and whose diameter is such that it can be placed easily within the outer member with the material on it, but is big enough so that when heated it will expand sufficiently to press the material firmly against the outer member, substantially as set forth.

6. In a mold for applying pressure to material while it is heated as in vulcanizing, the combination of an outer annular member of comparatively hard metal, an inner ring of comparatively soft metal having a coefficient of expansion higher than that of the outer member, and a supporting element of harder metal mounted as a backing for the inner ring, the diameter of the composite inner element thus provided being such that the inner element can be dropped into the outer element with the material to be treated placed on the periphery of the former, but when the mold is heated the inner element will expand sufficiently to force the material against the opposing face of the outer element, substantially as set forth.

7. In a mold for applying pressure to material while it is heated as in vulcanizing, the combination of, an outer annular member of comparatively hard metal, an inner ring of comparatively soft metal having a coefficient of expansion considerably higher than that of the outer member, and a supporting element of harder metal having a peripheral trough in which the ring of softer metal lies, the diameter of the composite inner element thus provided being such that the inner element can be dropped into the outer element with the material to be treated placed on the periphery of the former, but when the mold is heated the inner element will expand sufficiently to force the material against the opposing face of the outer element, substantially as set forth.

8. In a mold for applying pressure to material while it is heated as in vulcanizing, the combination of an outer annular member of comparatively hard metal, an inner ring of comparatively soft metal having a coefficient of expansion considerably higher than that of the outer member, a supporting element of harder metal having a peripheral trough to receive the ring of softer metal and divided in the longitudinal direction of the trough for admitting the ring between the two parts, and means for securing the two parts together with the ring between them, the diameter of the composite inner element thus provided being such that the inner element can be dropped into the outer element with the material to be treated placed on the periphery of the former, but when the mold is heated the inner element will expand sufficiently to force the material against the opposing face of the outer element, substantially as set forth.

9. In a mold for applying pressure to material while it is heated as in vulcanizing, the combination of an outer annular member of comparatively hard metal, an inner ring of comparatively soft metal having a coefficient of expansion considerably higher than that of the outer member, a supporting element of harder metal having a peripheral trough to receive the ring of softer metal, the trough being of such depth that its bottom is free of the bottom or inner periphery of the ring, and means for centering the ring radially in the trough, the diameter of the composite inner element thus provided being such that the inner element can be dropped into the outer element with the material to be treated placed on the periphery of the former, but when the mold is heated the inner element will expand sufficiently to force the material against the opposing face of the outer element, substantially as set forth.

10. In a mold for applying pressure to material while it is heated as in vulcanizing, the combination of an outer annular member of comparatively hard metal, an inner ring of comparatively soft metal having a coefficient of expansion considerably higher than that of the outer member, a supporting element of harder metal having a peripheral trough to receive the ring of softer metal, the trough being of such depth that its bottom is free of the bottom or inner periphery of the ring, and compressible packing placed between the bottom of the trough and the bottom or inner periphery of the ring for the purpose of centering the ring, the diameter of the composite inner element thus provided being such that the inner element can be dropped into the outer element with the material to be treated placed on the periphery of the former, but when the mold is heated the inner element will expand sufficiently to force the material against the opposing face of the outer element, substantially as set forth.

11. In a mold for applying pressure to material while it is heated as in vulcanizing, the combination of an outer annular member of comparatively hard metal, an inner ring of comparatively soft metal having a coefficient of expansion considerably higher than that of the outer member, a supporting element of harder metal having a peripheral trough to receive the ring of softer metal, the trough being of such depth that its bottom is free of the bottom or inner periphery of the ring, the said ring and trough being made an easy fit at that part of the side walls which is near the outer periphery of the ring but a loose fit from such part to the inner periphery of the ring, and means for centering the ring radially in the trough, the diameter of the composite inner element thus provided being such that the inner element can be dropped into the outer element with the material to be treated placed on the periphery of the former, but when the mold is heated the inner element will expand sufficiently to force the material against the opposing face of the outer element, substantially as set forth.

In testimony whereof I have signed my name to this specification in the presence of two subscribing witnesses.

THOMAS SLOPER.

Witnesses:
  A. M. HAYWARD,
  RONALD S. DOLLEYMORE.